(12) United States Patent
Ng et al.

(10) Patent No.: US 7,640,385 B2
(45) Date of Patent: Dec. 29, 2009

(54) DUAL-MODE BUS STATION AND SYSTEM FOR COMMUNICATIONS

(75) Inventors: Chee Yu Ng, Singapore (SG); Yeow Khai Chang, Singapore (SG); Jerome Tjia, Singapore (SG); Kawshol Sharma, Singapore (SG)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 10/528,614

(22) PCT Filed: May 22, 2003

(86) PCT No.: PCT/IB03/02236

§ 371 (c)(1),
(2), (4) Date: Mar. 21, 2005

(87) PCT Pub. No.: WO2004/029817

PCT Pub. Date: Apr. 8, 2004

(65) Prior Publication Data

US 2006/0059289 A1 Mar. 16, 2006

(30) Foreign Application Priority Data

Sep. 24, 2002 (WO) .................... PCT/SG02/00239

(51) Int. Cl.
*G06F 13/00* (2006.01)
(52) U.S. Cl. .................... 710/300; 710/31; 710/314; 710/64
(58) Field of Classification Search ......... 710/300–317, 710/62–64, 72, 36–38, 8–19, 28–31, 110
See application file for complete search history.

(56) References Cited

U.S. PATENT DOCUMENTS

| | | | | |
|---|---|---|---|---|
| 5,784,581 A | * | 7/1998 | Hannah | 710/110 |
| 6,151,653 A | | 11/2000 | Lin et al. | |
| 6,370,603 B1 | * | 4/2002 | Silverman et al. | 710/72 |
| 6,549,966 B1 | * | 4/2003 | Dickens et al. | 710/300 |
| 6,732,218 B2 | * | 5/2004 | Overtoom et al. | 710/313 |
| 6,978,319 B1 | * | 12/2005 | Rostoker et al. | 709/250 |
| 7,000,057 B1 | * | 2/2006 | Novell et al. | 710/306 |
| 2005/0182883 A1 | * | 8/2005 | Overtoom | 710/305 |

FOREIGN PATENT DOCUMENTS

| | | |
|---|---|---|
| JP | 2000196986 A | 7/2000 |
| JP | 2000316006 A | 11/2000 |
| TW | 455805 B | 9/2001 |

\* cited by examiner

*Primary Examiner*—Raymond N Phan
(74) *Attorney, Agent, or Firm*—David V. Carlson; Seed IP Law Group PLLC

(57) ABSTRACT

A bus station in the form of a hardware dongle, operates in conjunction with a USB Device running suitable software. When the bus station determines that a bus host is connected to a first bus communication port thereof, it acts as a transceiver to allow conventional bus communications between said bus host and a bus device connected to a second bus communication port thereof. When the bus station determines that a bus device running suitable software is connected to the first bus communication port thereof, it acts as an alternate host to allow bus communications between said bus device connected to the first bus communication port and a bus device connected to a second bus communication port.

12 Claims, 2 Drawing Sheets

DUAL-MODE BUS STATION AND SYSTEM FOR COMMUNICATIONS

This invention relates to a bus connection system, and in particular to a device which can be used with electronic equipment in a bus communication system to allow the equipment to act as a host within the system.

The Universal Serial Bus (USB) communication system is becoming very widespread.

In a USB system, it is possible to interconnect many items of electronic equipment, such as personal computers, scanners, mobile phones, printers, etc. In any system, one item of equipment is always designated as the USB host, which controls connections with all of the other items, or USB devices. Personal computers are typically provided with the hardware and software required to allow them to act as USB hosts, but other items are typically not provided with the required hardware and software, and thus can only act as USB devices.

There are however situations in which it would be useful for an item of equipment to be able to act as a USB host, without requiring major modification of the equipment.

According to an aspect of the present invention, there is provided a bus station, preferably in the form of a hardware dongle, which can be connected to the bus communication port of a bus communication device, enabling it to act as a bus host. In the preferred embodiments of the invention, the bus station operates in the USB system, although the invention is also applicable to other bus communication systems.

More specifically, one aspect of the present invention provides a bus station which, when it determines that a bus host is connected to a first bus communication port thereof, acts as a transceiver to allow conventional bus communications between said bus host and a bus device connected to a second bus communication port thereof; and which, when it determines that a bus device running suitable software is connected to the first bus communication port thereof, acts as an alternate host to allow bus communications between said bus device connected to the first bus communication port and a bus device connected to a second bus communication port.

FIG. 1 is a block schematic diagram of a bus communication system in accordance with the invention.

The system 2 comprises a first USB Device 4 with a USB port 6, a second USB Device 8 and a dongle 10.

In this illustrated embodiment, the first USB Device 4 is a personal digital assistant (PDA), but it will be appreciated that the invention is applicable to any USB Device such as a mobile communications device, digital camera or a personal organizer.

The second USB Device 8 may be any USB Device including a printer, mouse, hard disk or modem.

The dongle 10 comprises an Embedded USB Host/Device Controller 12 with a first host port H1 and a second host port H2, and a low power Micro Controller Unit (MCU) 14.

Figure 1:
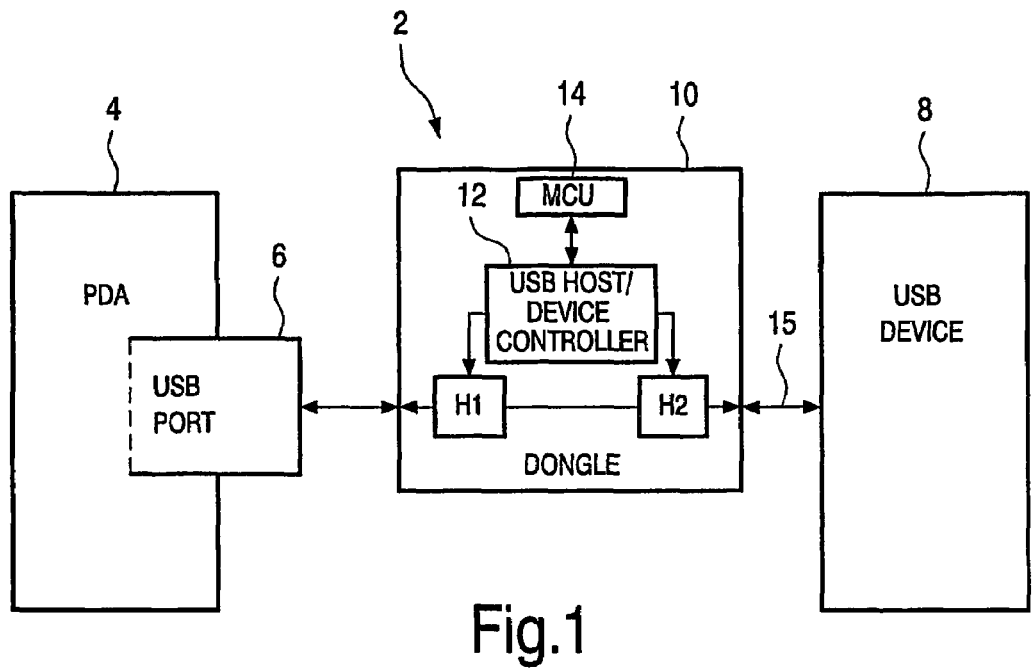
FIG. 1 is a block schematic diagram of a bus communication system.

The first host port H1 of the dongle 10 may be connected, as shown in FIG. 1, to the USB port 6 of the PDA 4. When the first host port H1 of the dongle 10 is connected to the USB port 6 of the PDA 4, the PDA is effectively enabled to act as a USB Host, and: the second host port H2 of the dongle 10 then effectively functions as a Host port of the PDA 4. Thus, the PDA 4 may control communications with any USB Device connected to the second host port H2 of the dongle 10 by means of a USB bus 15.

It should be noted that, while the first host port H1 and the second host port H2 are shown here connected to the same USB Host/Device Controller 12, it would be possible for the MCU 14 to communicate with the first host port H1 and the second host port H2 through two independent USB Host/Device Controllers, the first being dedicated to communication with the PDA 4, and the second being dedicated to communication with the connected USB device, or devices, 8.

In order to allow the PDA 4 to act as a USB Host when connected to the dongle 10, the PDA 4 requires a driver update.

The driver update is specific to the particular USB Device which is in use, and serves to add in a Virtual Hardware Abstraction Layer (VirtualHAL) software driver, which runs on top of the existing USB Device Hardware in the PDA 4.

Figure 2:
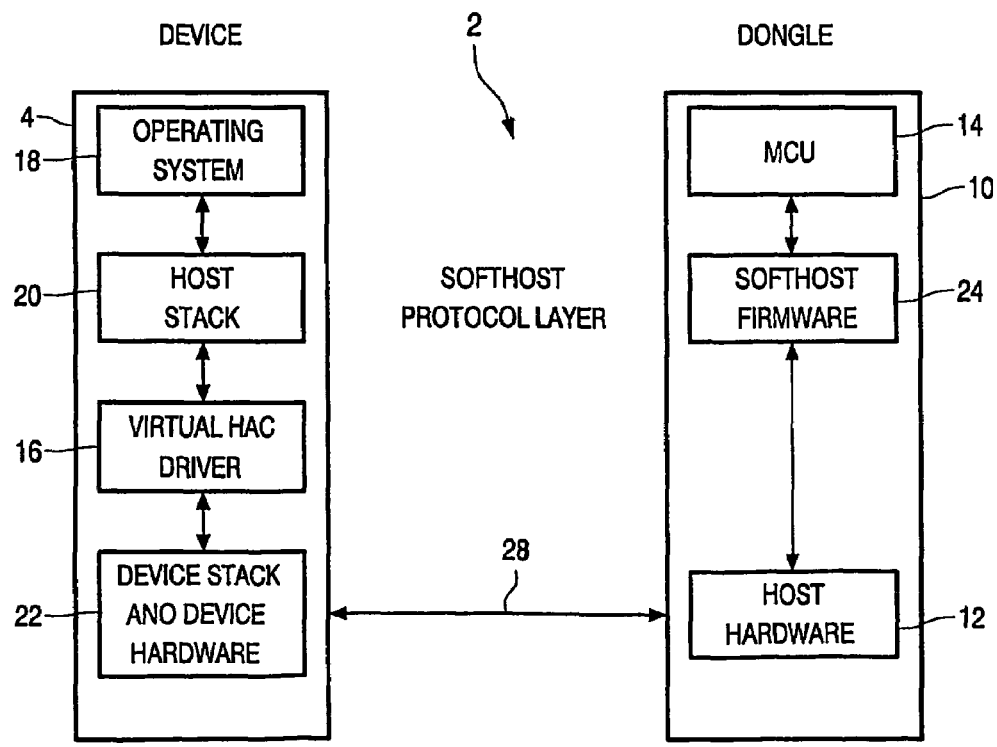
FIG. 2 is a block diagram showing the hardware and software in the system of FIG. 1.

FIG. 2 is a block diagram of the hardware and software in the system of FIG. 1.

As is conventional, the USB Device 4 has an operating system 18, a Host Stack 20 and Device Stack and Device Hardware 22. In order to be able to act as a USB Host, the PDA 4 also runs the VirtualHAL driver software 16. When the USB Device 4 is running the VirtualHAL driver software 16, it is sometimes referred to herein as a HostOnDevice.

The dongle 10 comprises Host Hardware 12 (that is, the USB host controller), MCU 14 and SoftHost Firmware 24.

The SoftHost protocol layer, which will be described in more detail below, controls the communications between the device 4 and the dongle 10 over the dongle connector 28.

Figure 3:
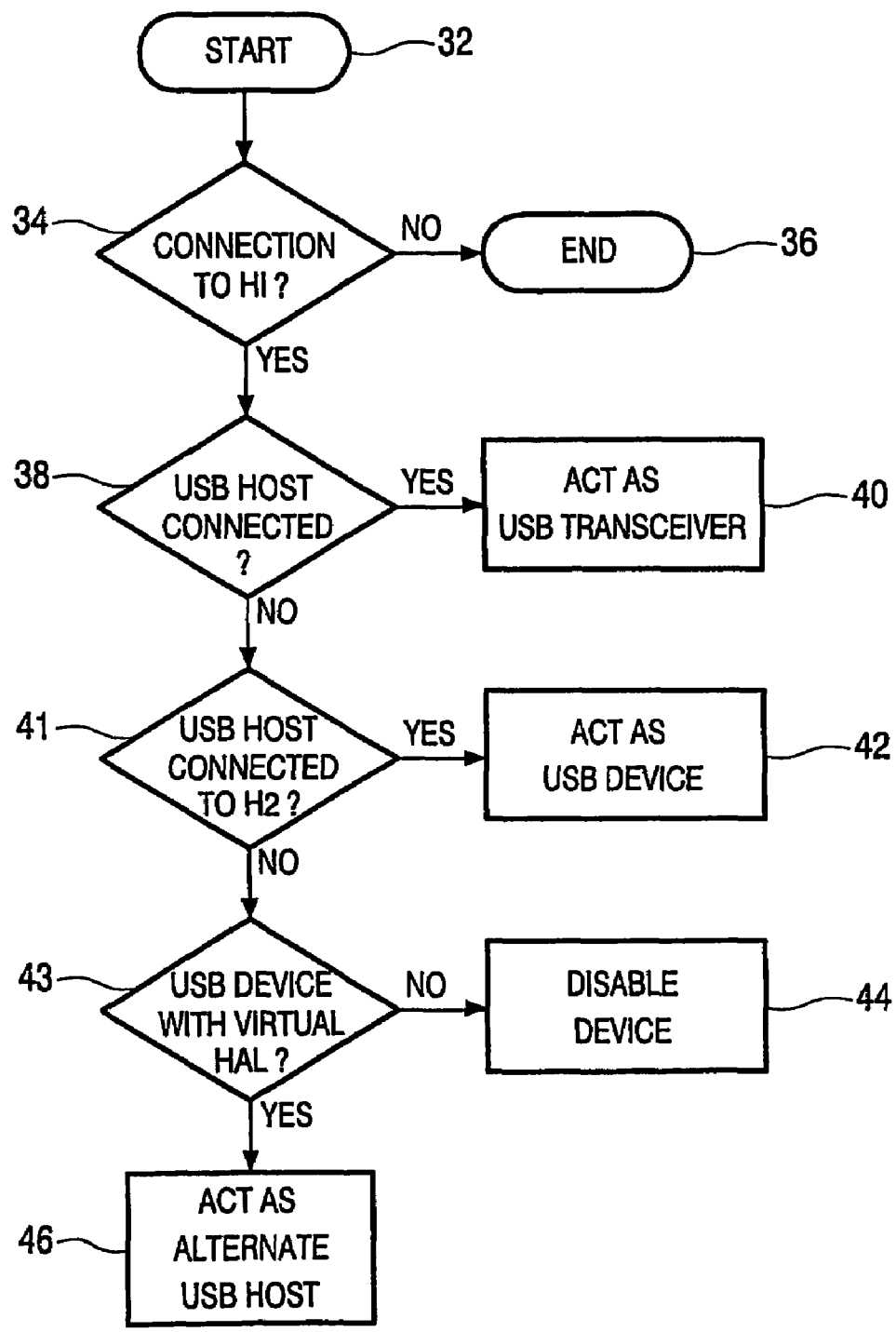
FIG. 3 is a flow chart showing a method in accordance with an aspect of the present invention.

FIG. 3 is a flow diagram illustrating the operation of the dongle 10, under the control of the MCU 14. Upon powering up, at step 32 in FIG. 3, the MCU polls the first host port H1 in step 34, to determine whether there is any connection thereto. If there is no connection, the process ends at step 36.

If there is a connection, the MCU determines in step 38 whether there is a USB Host connected to the first host port H1. If there is a USB Host connected to the first host port H1, then the process passes to step 40, in which the dongle 10 acts as a USB transceiver. That is, it passes communications directly between the first host port H1 and the second host port H2, allowing the connected USB Host to control communications with any USB device (or devices) connected to the second host port H2 in the conventional way.

If the MCU determines in step 38 that there is a USB Device, rather than a USB Host, connected to the first host port H1, the process passes to step 41, in which it determines if there is a USB Host connected to the second host port H2. If so, then in step 42 the USB Device core within the USB Host/Device Controller 12 operates to allow conventional USB communications between the USB Device connected to the first host port H1 and the USB Host connected to the second host port H2.

If there is a USB Device connected to the second host port H2, the MCU 14 enumerates the USB Device connected to the first host port H1 in step 43, and checks if it is a device running VirtualHAL. If the MCU determines in step 43 that the connected device 4 is not running VirtualHAL, it will disable the device 4 in step 44 and, for example, will trigger a flashing LED, signaling that the connected device 4 does not support VirtualHAL.

If the MCU determines in step 42 that the connected device 4 is running VirtualHAL, (i.e. that it has a VirtualHAL driver 16) the MCU 14 will go into operational mode in step 46, allowing the dongle 10 (together with the device 4) to act as an alternate USB Host. In this mode, which will be described in more detail below, the dongle 10 can control communications with any USB device (or devices) connected to the second host port H2.

In a conventional system, where a personal computer is a USB Host, a Host Stack accesses underlying USB Hardware through the HostHAL. Similarly, in a conventional PDA USB Device, a Device Stack accesses underlying USB hardware though a Device HAL.

However, in accordance with the invention, in the SoftHost system, when the Host Stack (or host station driver software) 20 needs to access the Host Hardware 12, it communicates the access operation details to the VirtualHAL Driver 16. The VirtualHAL Driver 16 wraps these access operation details in a pre-determined SoftHost Protocol. The SoftHost protocol packet is sent out through the existing USB Device Hardware 22 when the SoftHost Dongle 10 polls it for outstanding SoftHost Protocol packets.

Thus, the VirtualHAL Driver software 16 emulates the presence of a host controller towards the host station driver software. That is, from the point of view of the Host Stack 20, communicating with the VirtualHAL Driver 16 is no different from communicating with a HostHAL in a conventional system. The Host Stack 20 will see an actual Host Hardware through the VirtualHAL Driver 16.

Conversely, the VirtualHAL Driver software 16 emulates the presence of a device controller towards the device controller (or device stack) 22. The VirtualHAL Driver software 16 thus translates communications between the host station driver software 20 and the device controller.

The SoftHost Protocol provides the following access functions:

Reading a register in the dongle Host Hardware 12
Writing a register in the dongle Host Hardware 12
Reading buffer memory in the dongle Host-Hardware 12
Writing buffer memory in the dongle Host Hardware 12

More advanced functions could be added to improve the system performance, for example, a function that reads a register, AND/ORs it with a value and writes the amended value back into the register.

The SoftHost Protocol defines the method by which the Host Stack 20 running on VirtualHAL may access the hardware of the Host Controller 12 using the Device Controller hardware. The SoftHost protocol is described in detail below. In this description, the term "HostDongle" is used to refer to the dongle 10, while the term "HostOnDevice" is used to refer to the device 4, namely an embedded system with USB device hardware 22, running a Host Stack 20 on Virtual 16.

The SoftHost protocol starts at the end of FIG. 3, at the point where the HostDongle 10 has enumerated the connected device 4 and the connected device 4 is confirmed to be a HostOnDevice.

In operational mode, the MCU 14 sets up an interrupt pipe and polls the VirtualHAL driver 16 for data every millisecond. Data sent between the device 4 and dongle 10 is sent by means of the SoftHost protocol, in the form of SoftHost Packets. If the Host Stack 20 on the PDA 4 has sent a hardware access request through the VirtualHAL Driver 16, the VirtualHAL Driver 16 will send the request as a SoftHost-Packet when the first host port H1 of the dongle 10 polls it through the interrupt pipe.

The MCU 14 will retrieve this SoftHost Packet from the buffer memory of the embedded USB Host Controller 12 and execute the hardware access accordingly. If there is any data to be returned (read operations), the MCU 14 will send out the corresponding data through Host 1.

Traffic

The HostDongle 10 and the HostOnDevice 4 communicate using a dedicated bidirectional bulk pipe. There are four types of payloads.

HRU (HostDongle Request Unit)
    Sent by HostDongle 10
    A bulk packet of 8 bytes payload
    Used for polling the HostOnDevice 4
    May contain Interrupt Information (HRU_IRQ)
    HostDongle 10 ALWAYS sends a bulk-in of 64 bytes after sending the HRU.
    HostOnDevice 4 would reply with NOB or CRP through this bulk-in.

NOB (No Outstanding Business)
    Sent by HostOnDevice 4
    A bulk packet of 8 bytes payload
    Sent when there are no outstanding transactions CRP (Common Request Packet)
    Sent by HostOnDevice 4
    A bulk packet of 16-64 bytes
    Contains the results of previously received CRP commands, and an optimal data set.

APR (As Per Requested)
    Sent by HostDongle 10
    A bulk packet of 16-64 bytes The Flow As in all USB systems, transfers start with an action by the Host. In the case of the SoftHost protocol, the SoftHost Dongle 10 is always the Host. All SoftHost transfer cycles starts with a HRU, as defined above. The current transfer cycle must be completed before the HostDongle 10 starts the next transfer cycle.

Poll-Nothing Cycle: HRU-NOB
    HostDongle 10 polls the HostOnDevice 4 for outstanding command sets. If
    there are no outstanding command sets, HostOnDevice 4 replies with NOB.
    Transactions:
    HostDongle 10 sends BULK-OUT
    HostDongle 10 sends DATA (HRU)
    HostOnDevice 4 sends ACK
    HostDongle 10 sends BULK-IN
    HostOnDevice 4 sends DATA (NOB)
    HostDongle 10 sends ACK Poll-Something Cycle: HRU-CRP-APR
    HostDongle 10 polls the HostOnDevice 4 for outstanding command sets.
    HostOnDevice 4 sends outstanding command set by CRP.
    HostDongle 10 executes the command and returns the results by APR.
    Transactions:
    HostDongle 10 sends BULK-OUT
    HostDongle 10 sends DATA (HRU)
    HostOnDevice 4 sends ACK
    HostDongle 10 sends BULK-IN
    HostOnDevice 4 sends DATA (CRP)
    HostDongle 10 sends ACK
    HostDongle 10 sends BULK-OUT
    HostDongle 10 sends DATA (APR)
    HostOnDevice 4 sends ACK Interrupt Cycle: HRU_IRQ-CRP-APR
    HostDongle 10 alerts the HostOnDevice 4 on outstanding hardware interrupts. HostOnDevice 4 decides on the appropriate command sets and sends them by CRP. HostDongle 10 executes the commands and returns the results by APK HostOnDevice 4 MUST clear the outstanding interrupt or disable the generation of HRU_IRQ, or the HostDongle 10 would send HRU_IRQ continuously.

Transactions:
HostDongle 10 sends BULK-OUT
HostDongle 10 sends DATA (HRU_IRQ)
HostOnDevice 4 sends ACK
HostDongle 10 sends BULK-IN
HostOnDevice 4 sends DATA (CRP)
HostDongle 10 sends ACK
HostDongle 10 sends BULK-OUT
HostDongle 10 sends DATA (APR)
HostOnDevice 4 sends ACK Packet Formats
HRU Format
The HRU contains the following information:
Current Frame Number
HcInterruptStatus of Host Controller 12 in HostDongle 10
Interrupt Status of Device Controller 22

NOB Format
No special information required

CRP and APR Format
Active bit in Header is 1 n for CRP, and 0 for APR.
CRP can be of a size of 16-64 bytes. The total size is made up of
A number of command sets (8 bytes each)
An optional data set.
Maximum number of command sets in a CRP is 8.
Maximum size of data set is 64-(8* number of command sets).
The multiple command sets in a single command request packet allows a sequence of hardware accesses to be communicated in a single packet and thus reduces the latency transfer.

Command Set Format
Command Set is an 8-byte data structure. It contains the following information:
Command Set Header (1 byte)
Command Set Index (2 bytes)
Command Set Data (4 bytes)
Command Set Aux (1 byte)

| Bit | 7 | 6 | 5 | 4 | 3 | 2 | 1 | 0 |
|---|---|---|---|---|---|---|---|---|
| Group Attribute | Active Boolean | Remaining Sets 0-7.0 means last set | | | OpCode 0-15 | | | |

| OpCode | Operation by MCU |
|---|---|
| 0 | Write [Aux] bytes from [Data] into [Index] register |
| 1 | Read [Aux] bytes from [Index] register into [Data] |
| 2 | Write [Data] bytes from DataSet into address location [Index] |
| 3 | Read [Data] bytes into DataSet from address location [Index] |
| 4 | Read [Aux] bytes from [Index] register, OR with [Data] and write back into [Index] register |
| 5 | Read [Aux] bytes from [Index] register, AND with [Data] and write back into [Index] register |
| 6 | Set polling rate to [Index] |
| 7 | Set HRU_IRQ On/Off |
| 8-15 | Reserved. No Action by MCU |

The Virtual Hardware Abstraction Layer (VirtualHAL) therefore provides complete access to the target hardware on the connected dongle, using the USB Device hardware. In other words, the existing USB Device hardware is used as an asynchronous microprocessor interface bus to allow the USB Host Driver to access the target hardware.

The use of VirtualHAL provides the advantages that the hardware dongle does not need to handle USB software, which allows the dongle to be low cost, and the Host software can be handled by the embedded system on the USB Device.

Therefore, in the preferred embodiments of the invention, there is provided a hardware dongle that allows a USB Device to attain the capability of USB Host without changes to the existing hardware. In order to achieve this, the USB Device runs emulation software that can be handled by the embedded system on the USB Device. This provides the advantages that the hardware dongle does not need to handle USB software, which allows the dongle to be low cost.

The invention has been described up to this point with reference to a system in which the VirtualHAL driver software allows the USB Device to function as a USB Host in conjunction with the dongle 10. However, similarly structured Virtual driver software could be used to add in multiple interface/functions to a system with USB Device capability. For example, the driver software could allows the USB Device to communicate over Bluetooth, IrDA, USB-OTG, or other communications protocols.

The invention claimed is:

1. A bus station for use in a bus communication system comprising:
a first communication port and a second communication port,
said bus station being arranged to operate in a first mode upon detection of the presence of a host station coupled to said second port, said first mode of operation to pass communication between said host station coupled to said second port and a first device station coupled to said first port,
said bus station further being arranged to operate as an alternate host station in a second mode of operation upon detection of the absence of the host station coupled to said second port, said bus station arranged in said second mode of operation to communicate with said first device station coupled to said first port on behalf of a further device station coupled to said second port, said communication according to a communication protocol wherein said bus station initiates communications and the further device station appears as a host station to the first device station and performs operations, including communications, therewith.

2. A bus station according to claim 1 wherein said bus station is arranged to operate as a USB transceiver in said first mode of operation and to operate as a USB host in said second mode of operation.

3. A bus station according to claim 1 wherein said bus station further comprises transceiver circuitry coupled to said first and second port for passing communication between said host station coupled to said second port and said first device station in said first mode of operation.

4. A bus station according to claim 1, wherein the bus station is further arranged to operate in the first mode upon detecting a host station coupled to the first communication port and to pass communications between the host station coupled to the first communication port and a device station coupled to the second communication port in the first mode of operation.

5. A bus station according to claim 1, wherein the further device station coupled to the second communication port includes a device controller and the further device station is arranged to operate under control of host emulation software.

6. A bust station according to claim 5, wherein, in the second mode of operation, the host emulation software emulates the presence of host station driver software to the first device station and the host emulation software emulates the presence of device station driver software to the device controller of the further device station.

7. A bus station according to claim 5, wherein, in the second mode of operation, the host emulation software translates communication between the device controller of the further device station and the first device station coupled to the first communication port.

8. A bus station for use in a bus system, comprising:
a device controller coupled to a communication port, the bus station being arranged to operate as a device station, said bus station further being arranged to operate under control of system software including an operating system and host station driver software, the host driver software being arranged to communicate with a host controller and to pass information to and from the operating system, said system software further including host emulation software being arranged to emulate the presence of a host controller towards the host station driver software and the presence of device station driver software towards the device controller, further being arranged to translate communication from the host station driver software to the device controller and vice versa.

9. The system of claim 8, wherein the communication port is a USB communication port.

10. A bus communication system comprising:
a first bus station having a device communication port, and
a second bus station having a first communication port and a second communication port, said second bus station being arranged to operate in a first mode upon detection of the presence of a host station coupled to said second port and to operate in a second mode upon detection of the absence of a host station coupled to said second port;
wherein said first station comprises a device controller coupled to said device communication port and being arranged to operate under control of system software, having an operating system and host station driver software being arranged to communicate with a host controller and to pass information to and from the operating system, wherein said system software further comprises host emulation software being arranged to emulate the presence of a host controller towards the host station driver software and the presence of a host controller towards the device controller, further being arranged to translate communications from the host station driver software to the device controller and vice versa.

11. The system of claim 10, wherein the device communication port, the first communication port, and the second communication port are USB communication ports.

12. A bus system according to claim 10, wherein the second bus station further includes transceiver circuitry coupled to said first and second communication ports for passing communications between said host station coupled to said second port and said first bus station in said first mode of operation.

* * * * *